United States Patent
Ahn et al.

(10) Patent No.: US 7,353,025 B2
(45) Date of Patent: Apr. 1, 2008

(54) UPLINK SCHEDULING METHOD OF WIRELESS MOBILE COMMUNICATION SYSTEM

(75) Inventors: Joon-Kui Ahn, Seoul (KR); Hak-Seong Kim, Seoul (KR); Seung-Hwan Won, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 10/933,458

(22) Filed: Sep. 3, 2004

(65) Prior Publication Data

US 2005/0079865 A1  Apr. 14, 2005

(30) Foreign Application Priority Data

Sep. 29, 2003  (KR) ............... 10-2003-0067479
Nov. 15, 2003  (KR) ............... 10-2003-0080865

(51) Int. Cl.
*H04Q 7/20* (2006.01)
(52) U.S. Cl. ............ 455/434; 455/422.1; 455/447; 455/444
(58) Field of Classification Search ........ 455/418, 455/422.1, 434, 447; 370/444
See application file for complete search history.

(56) References Cited

U.S. PATENT DOCUMENTS

| | | | |
|---|---|---|---|
| 6,822,969 B2 * | 11/2004 | Love et al. .............. 370/444 |
| 2002/0181436 A1 | 12/2002 | Mucckenheim et al. .... 370/349 |
| 2003/0013451 A1 * | 1/2003 | Walton .................. 455/447 |
| 2003/0101274 A1 | 5/2003 | Yi et al. ................ 709/232 |
| 2004/0224677 A1 * | 11/2004 | Kuchibhotla et al. .... 455/422.1 |
| 2005/0079865 A1 * | 4/2005 | Ahn et al. .............. 455/434 |

FOREIGN PATENT DOCUMENTS

KR  10-2001-0110536 A  12/2001
KR  10-2003-0068014 A  8/2003

* cited by examiner

*Primary Examiner*—Joseph Feild
*Assistant Examiner*—Charles Shedrick
(74) *Attorney, Agent, or Firm*—Ked & Associates, LLP

(57) ABSTRACT

A method of uplink transmission scheduling for a network including at least one radio network controller (RNC), at least one user equipment (UE), and a plurality of Node Bs. The method includes determining a parameter to be applied to an uplink transmission schedule of the at least one UE based on an interference effect caused by the at least one UE to a scheduling Node B or to neighboring Node Bs.

12 Claims, 5 Drawing Sheets

UTRAN

UPLINK SCHEDULING METHOD OF WIRELESS MOBILE COMMUNICATION SYSTEM

CROSS-REFERENCE TO RELATED APPLICATIONS

The present application claims priority to Korean patent application Nos. 067479/2003, filed on Sep. 29, 2003, and 080865/2003, filed on Nov. 15, 2003, all of which are incorporated in their entirety. The present invention is also related to U.S. applications Ser. No 10/845,087, filed on May 14, 2004; and Ser. No. 10/921,361 filed on Aug. 19, 2004, all of which are hereby incorporated in their entirety.

BACKGROUND OF THE INVENTION

1. Field of the Invention

The present invention relates to a wireless communication system, and more particularly to a Node B scheduling method applicable to an uplink channel that reduces a variation of uplink interference in the wireless communication system.

2. Background of the Related Art

In radio (wireless) mobile communication systems, the concept of an Enhanced Uplink Dedicated Channel (E-DCH) is being discussed to address the demand for a high-speed uplink. As known, a wireless communication network typically includes a plurality of mobile stations (MS), a plurality of base stations (BS), a base station controller (BSC), a mobile switching center (MSC), a packet data service node (PDSN) or interworking function (IWF), a public switched telephone network (PSTN), and an Internet protocol (IP) network.

In a Universal Mobile Telecommunication System (UMTS), a base station is referred to as a Node B, a mobile terminal, subscriber unit, etc. is referred to as a User Equipment (UE), and a base station controller is referred to as a Radio Network Controller (RNC). See, for example, JUHUA KORHONEN, INTRODUCTION TO 3G MOBILE COMMUNICATIONS SYSTEMS ($2^{nd}$ ed. 2003), the entire contents of which are hereby incorporated by reference in its entirety.

In one example, the RNC is responsible for scheduling at what data rate or power the UEs transmit and also when the UE is to transmit. This information is sent to the Node Bs, which then inform the UEs. The UEs may then transmit at or below the allowable data rate or power. However, the allowable transmission rate/power is only determined based on the scheduling Node B.

SUMMARY OF THE INVENTION

Accordingly, one object of the present invention is to address at least the above and other noted problems.

Another object of the present invention is to provide an uplink scheduling method capable of effectively managing an uplink RoT (Rise over Thermal) noise.

Still another object of the present invention is to provide an uplink scheduling method in which either a Node B or a UE performs uplink scheduling operations.

To achieve at least the above objects in whole or in parts, the present invention provides a novel method of uplink transmission scheduling for a network including at least one radio network controller (RNC), at least one user equipment (UE), and a plurality of Node Bs. The method includes determining a parameter to be applied to an uplink transmission schedule of the at least one UE based on an interference effect caused by the at least one UE to a scheduling Node B or to neighboring Node Bs.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

BEST MODE OF THE INVENTION

Figure 1:
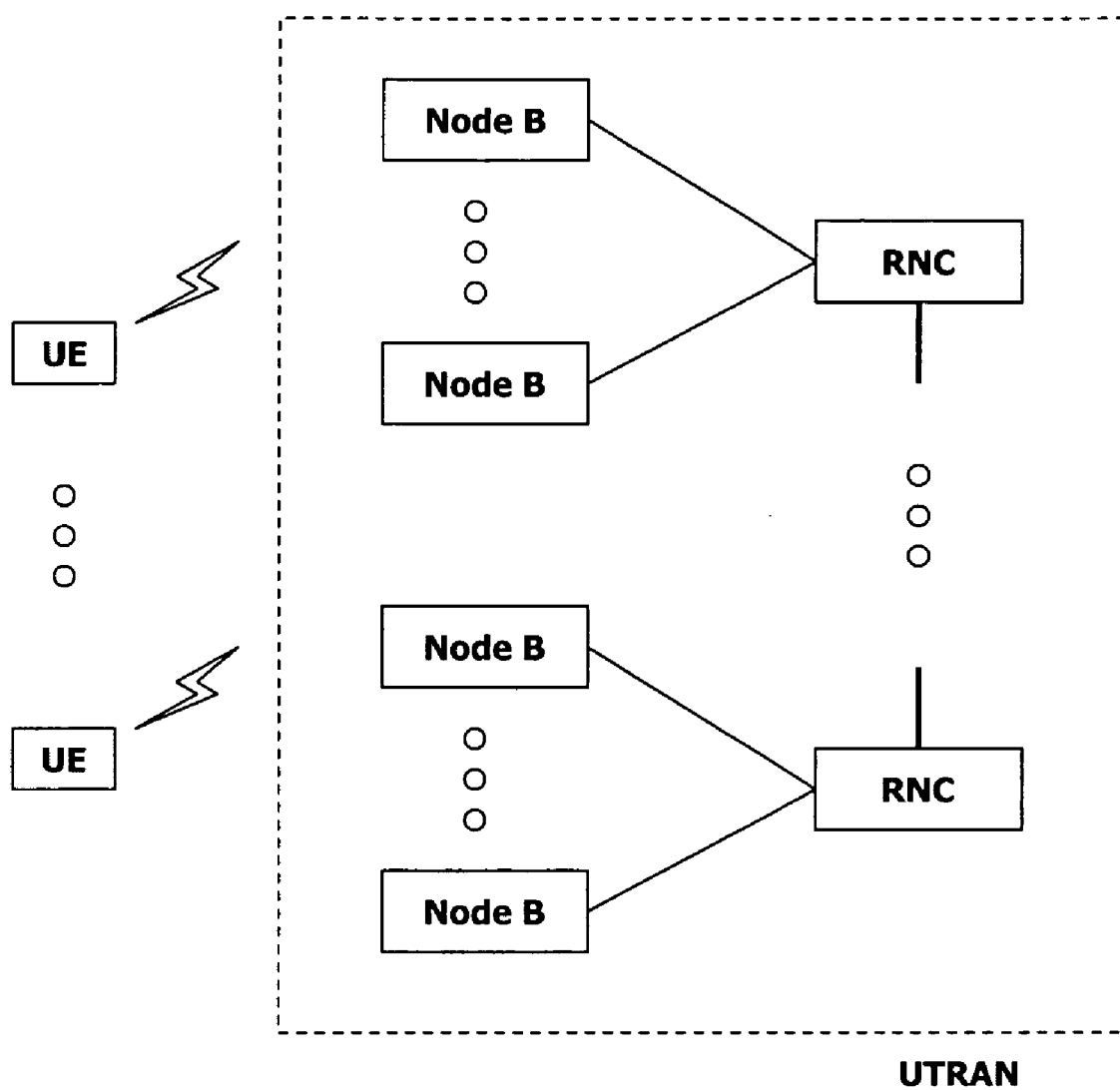
FIG. 1 is a block diagram illustrating a portion of an asynchronous system for explaining a scheduling method according to the present invention.

Referring now to the drawings, wherein like reference numerals designate identical or corresponding parts throughout the several view, the present invention will be discussed.

The present invention provides a novel method of scheduling an uplink channel such as an E-DCH. In the below examples, the RNC determines credit values to be assigned to each UE, and then informs the Node Bs of the credit values. The Node Bs may then use these credit values to schedule when and at what data rate or transmission power the UEs can transmit data. Alternatively, the RNC informs the UEs (via the Node Bs) of the scheduling credit values. Then, the UEs may use the credit values as a probability or apply the credit value to the scheduling command received from the Node B. The above-noted examples will now be further described with reference to the figures.

In more detail, FIG. 1 illustrates a portion of a Universal Terrestrial Radio Access Network (UTRAN), which includes multiple Radio Network Controllers (RNCs) and multiple Node-Bs managed by a corresponding RNC. Further, each Node-B includes a scheduler (such as a scheduling algorithm, for example) for scheduling transmissions between the UE and Node B. Further, the RNC controls one or more Node Bs and performs functions such as managing traffic for common and shared channels, controlling the Node Bs logical operation and maintenance (O&M) resources, controlling Soft Handover (SHO) related activities, etc.

According to the present invention, the RNC manages information related to the path-gains or path-losses, for example, from the corresponding UEs to the scheduling Node B, how much uplink interference is being caused by the UEs with respect to the cell the UE is operating in, as well as how much uplink interference the UEs are causing to neighboring cells. Using this information, the RNC is able to calculate suitable parameters to ensure the uplink noise rise or RoT (Rise over Thermal) noise of a scheduling Node B is maintained within a predetermined range, as well as ensuring the UEs under control of the scheduling Node B do not detrimentally affect/interfere with the uplink noise rise or RoT of neighboring Node Bs. Note the noise rise margin is defined as a margin between the noise rise limitation of the Node B and the average noise rise. A smaller noise rise margin or RoT allows the communication system to provide a larger capacity, for example.

Further, the RNC may calculate a scheduling credit value for each UE based on the path-gains or path-losses, provides the calculated scheduling credits to the Node Bs or UEs. The weight values may also be determined based on the interference level of the scheduling cells and neighboring cells or a service priority of each UE.

First, an example of the UEs using the scheduling credit values will be discussed followed by an example of the Node Bs using the scheduling credit values.

Application of a Scheduling Weight Value by the UE

The application of a scheduling credit value by the UE includes, for example, the following two cases.

In a first example, each UE applies a scheduling credit value received from the RNC to determine a transmission probability (or transmission priority). That is, the Node B schedules a UE with an allowable transmission power/rate and a specific transmit time, and the UE uses the scheduling credit values (determined and sent by the RNC) to decide whether or not to transmit data. If the UE does decide to transmit data, the transmission is performed at or under the allowable transmission power/rate For example, if a scheduling credit value for a UE is 0.7, the UE can determine that there is a 70% probability that the UE will transmit data.

Note, the credit values are preferable determined so at to "punish" UEs that are closer to neighboring cells, because these particular UEs are farther away from their scheduling Node B and thus transmit with a higher power or transmission rate. This higher power or transmission rate has a larger impact on neighboring cells than does a UE that is operating relatively close to its scheduling Node B. The higher power or transmission rate also has a larger impact on UEs operating under control of the scheduling Node B. Further, also note that the scheduling credit value is a numeric value between 0 and 1. In addition, a credit value of 0.1 is more of a "punishment" to a UE than is a credit value of 0.7 (i.e., the credit value corresponds to a 10% probability of transmitting data verses a 70% probability of transmitting data).

In a second example, each UE applies the scheduling credit value in determining an allowable transmission power/rate. For example, assume a Node B has provided the UE with a transmission scheduling command informing the UE of an allowable transmission power/rate. In this instance, the corresponding UE applies the scheduling credit value determined by the RNC and sent from the Node B to the scheduling command. For example, if a transmission power of XdB was assigned to the UE and a scheduling credit value of 0.7 was sent to the UE, the UE could multiply 0.7 times XdB to determine an allowable transmit power.

Figure 2:
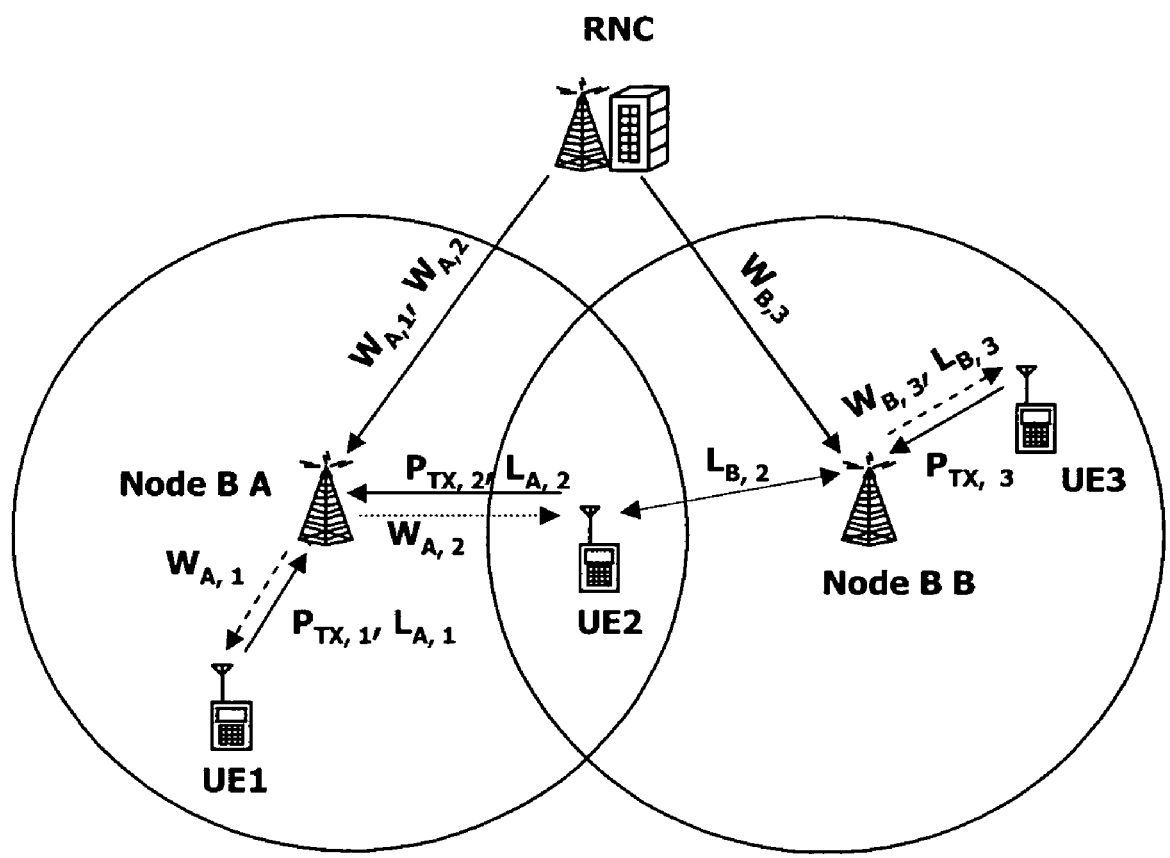
FIG. 2 is an overview illustrating a process of transmitting determined credit values to each UE through a Node B.

Turning now to FIG. 2, which illustrates the UE's using the credit values to determine a transmission priority/probability or to determine a transmission power/rate. As shown, FIG. 2 illustrates a RNC controlling a Node B A and a Node B B, and sending credit values to the UEs. In more detail, FIG. 2 illustrates the RNC determining the credit values $W_{A,1}$; $W_{A,2}$; and $W_{B,3}$ and sending these credit values to the corresponding UE via Node B A and Node B B. FIG. 2 also illustrates the UE1, UE2 and UE3 transmitting within the allowable transmission power/rate, which is labeled as $P_{TX1}$, $P_{TX2}$, and $P_{TX3}$, respectively. Note that the Node B A and Node B B also send transmission scheduling commands to inform the UEs of the transmit time as well as the allowable transmission power/rate.

Figure 3:
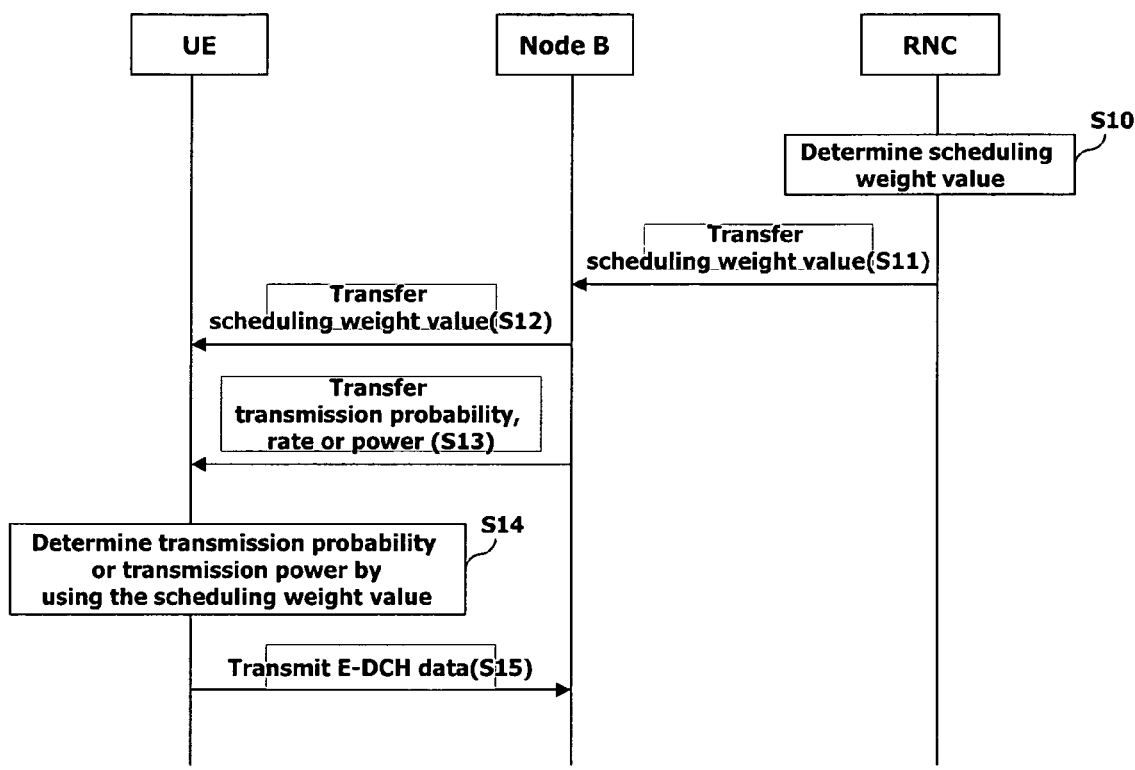
FIG. 3 is a flow diagram illustrating uplink scheduling being performed by a UE using a credit value provided from a RNC.

FIG. 3 is a flow diagram illustrating the RNC determining scheduling credit values based on management information (path-gain, path-loss, interference caused to a home Node B and neighboring Node Bs, etc.) of each UE (step S10), transmitting the scheduling credit values $W_{A,1}$ and $W_{A,2}$ to UE1 and UE2, respectively, and transmitting the scheduling credit value $W_{B,3}$ to UE3 (steps S11 and S12). As noted above, the Node B A and Node B B also send transmission scheduling commands to the UEs (step S13). Note that the step S13 may be performed at the same time or before steps S11 and S12. Further, FIG. 3 illustrates the corresponding UE determining the transmission probability/priority, rate or power as discussed above (step S14). If the corresponding UE decides to transmit, the UE transmits at a value equal to or below the final calculated scheduling value (step S15).

The credit values may be calculated using the below equations, for example. Other methods of calculating the credit values probabilities may be used, such as the methods disclosed in U.S. application Ser. No. 10/921,361 filed on Aug. 19, 2004, which as noted above is incorporated in its entirety. The credit values are calculated to reduce the variation in uplink interference caused to the scheduling cells and neighboring cells so as to increase the overall system capacity.

Note FIG. 2 illustrates path-losses for each UE. For example, $L_{A,1}$ is the path-loss for UE1 with respect to Node B A, $L_{A,2}$ is the path-loss for UE2 with respect to Node B A, and $L_{B,3}$ is the path-loss for UE3 with respect to Node B B. FIG. 2 also illustrates that $L_{B,2}$ is the path-loss for UE2 with respect to Node B B (because UE2 is in soft handover with Node B A and Node B B). In this example, the weight values $W_{A,1}$, $W_{A,2}$, $W_{B,3}$ with respect to UE1, UE2 and UE3, respectively, may be defined by the following equations:

$$W_{A,1} = 1$$

$$W_{B,3} = 1, \text{ and}$$

$$W_{A,2} = \frac{1/L_{A,2}}{\frac{1}{L_{A,2}} + \frac{1}{L_{B,2}}}$$

In this example, $W_{A,1}$ is set to "1" because the path-loss from UE1 to Node B B is sufficiently large so as not to significantly interfere with Node B B. Similarly, $W_{B,3}$ is set to "1," because the path-loss from UE3 to Node B A is sufficiently large so as not to significantly interfere with Node B A. $W_{A,2}$ takes into consideration the path-losses from UE2 to Node B A and Node B B. Note also that in this example, Node B A is scheduling UE1 and UE2, and Node B B is scheduling UE3.

As noted above, the path-gains may also be used. The Node B using the credit values will now be described.

Application of Scheduling Credit Values by the Node B

Application of the scheduling weight values by the node B includes, for example, the following two cases. Note, these examples are similar to the examples described for the UE using the credit values.

In this first example, the node B applies the scheduling credit values received from the RNC as a priority/probability for selecting UEs allowed to transmit at a certain transmit time. For example, if a scheduling Node B is controlling three UEs, and the scheduling credit values for the three UEs are 1.0, 0.5 and 0.2, respectively, the Node B may then schedule the first UE (UE1) to transmit first because it has a probability of 1.0 or 100% probability to transmit, the second UE (UE2) to transmit second because it has a 0.5 or 50% probability to transmit, and the third UE (UE3) to transmit last because it has a 0.2 or 20% probability to transmit.

In another variation, assume the Node B has already transmitted scheduling commands to the UEs under its control without knowing scheduling credit values, and then the RNC sends scheduling credit values to the Node B. In this instance, the Node B applies the probability or priority determined from the scheduling credit values to the UEs, and determines whether or not the already scheduled UEs can still transmit based on the new scheduling values. For example, if the Node B had initially scheduled the UE for immediate transmission, but the RNC sent a scheduling credit value of 0.1 corresponding to a 10% probability of transmitting, the UE having the 10% probability would not be allowed to transmit before other UEs that had a higher probability of transmitting data.

In a second example, the Node-B uses the scheduling credit values received from the RNC to determine an allowable transmission power/rate of each UE. That is, under a same condition, a UE with a larger credit value is assigned a larger allowable transmission power/rate than a UE with a smaller credit value, for example.

The Node B may also apply the scheduling credit value to a previously determined scheduling command and then inform the UE(s) they may transmit using a value equal to or below the allowable transmission power/rate. Again, the scheduling credit value is a numeric value between 0 and 1.

Figure 4:
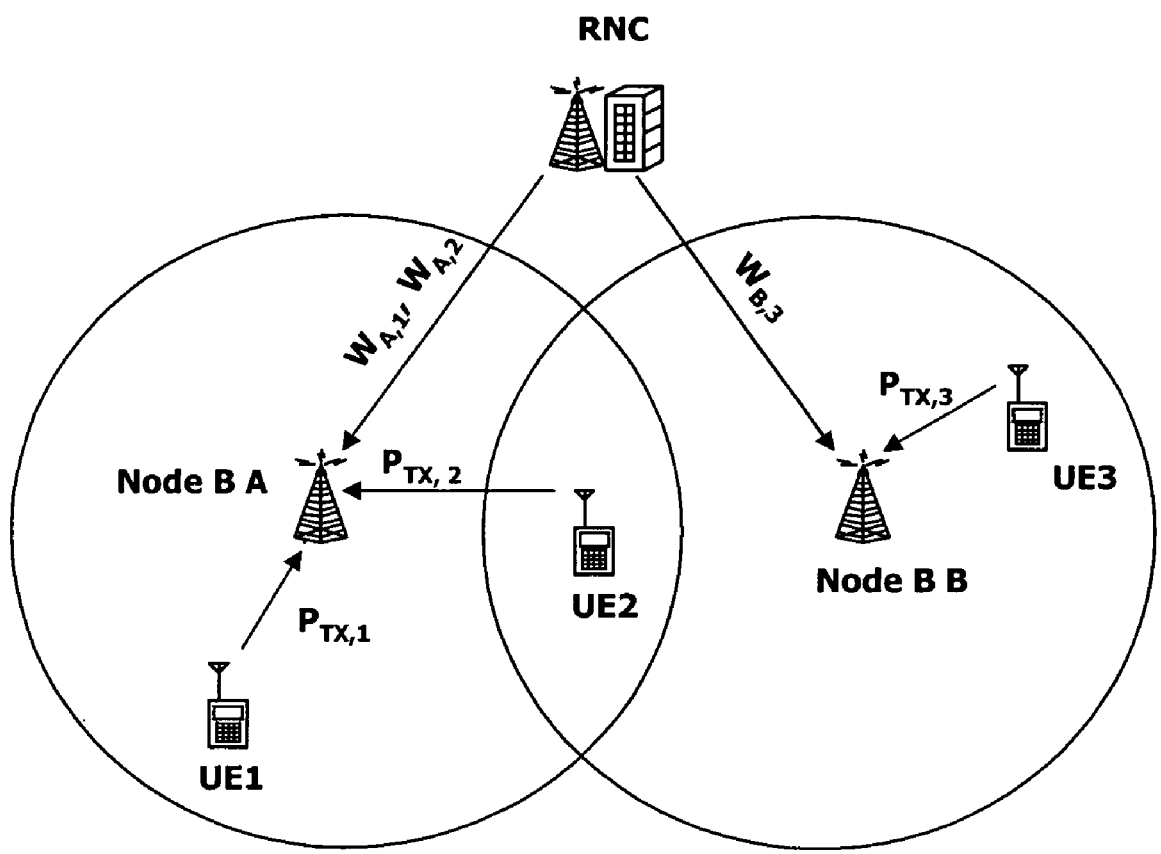
FIG. 4 is an overview illustrating a process of transmitting determined credit values to Node Bs.

Turning now to FIG. 4, which illustrates the Node B using the credit values determine and sent by the RNC to determine an allowable transmission power/rate/priority. As shown, FIG. 4 illustrates a RNC controlling a Node B A and a Node B B, and the scheduling credit values being determined by the RNC and sent to the Node Bs. In more detail, FIG. 4 illustrates the Node B A receiving the scheduling credit values $W_{A,1}$ and $W_{A,2}$ for UE1 and UE2, respectively, and the Node B B receiving the scheduling credit value $W_{B,3}$ for UE3. FIG. 4 also illustrates the UE1, UE2 and UE3 transmitting within the allowable transmission power/rate, which is labeled as $P_{TX1}$, $P_{TX2}$, and $P_{TX3}$, respectively. The weight values and probabilities may be calculated as noted above.

Figure 5:
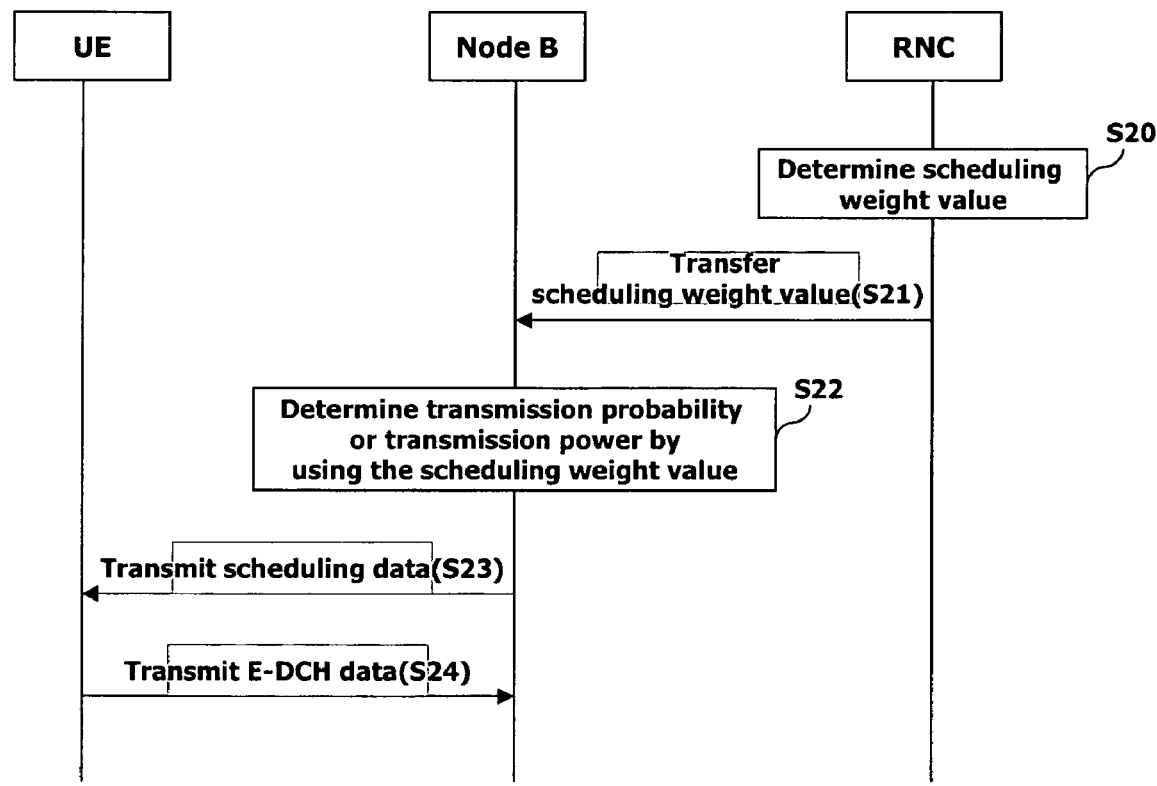
FIG. 5 is a flow diagram illustrating uplink scheduling being performed by a Node B using a credit value provided from a RNC.

Next, FIG. 5 is a flow diagram illustrating the RNC determining the scheduling credit values based on management information (path-gain, path-loss, interference, etc.) of each UE (step S20), transmitting the scheduling credit values $W_{A,1}$ and $W_{A,2}$ to the Node B A, respectively, and transmitting the scheduling credit value $W_{B,3}$ to the Node B B (steps S21) Further, FIG. 5 illustrates the corresponding Node B determining the transmission probability/rate/power as discussed above (step S22). The corresponding Node B then sends scheduling commands to the UEs (step S23) and the UEs transmit data within the allowable transmission power/rate/priority (step S24). The scheduling commands include, for example, a transmission power/rate/priority and a transmit time.

The present invention may be implemented in a W-CDMA mobile communication system. Nonetheless, the present invention can be also applied to a communication system operating in conformity with different standards.

Further, the term "scheduling credit value" is used above. However, the term "scheduling weight value" or other term may also be used.

Thus, according to the present invention, scheduling credit values are used to reduce the variation in uplink inference in the communication system to increase the system capacity.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software are. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of uplink transmission scheduling for a network including at least one radio network controller (RNC), at least one user equipment (UE), and a plurality of Node Bs, the method comprising:

determining a parameter to be applied to an uplink transmission schedule of the at least one UE based on an interference effect caused by the at least one UE to a scheduling Node B or to neighboring Node Bs, wherein the at least one RNC determines the parameter to be applied to the uplink schedule and transmits the determined parameter to the at least one UE, and the at least one UE determines a scheduling transmission probability that the at least one UE will transmit based on the parameter, wherein the uplink schedule includes a transmit power or transmit rate to be used by the at least one UE, the parameter comprises a credit value, and the at least one UE applies the credit value to the transmit power or the transmit rate included in the uplink schedule to determine an allowable transmit power or transmit rate, wherein the at least one UE includes a plurality of UEs, and UEs causing a larger amount of uplink interference to neighboring cells are assigned a smaller credit value than UEs causing a smaller amount of uplink interference.

2. The method of claim 1, wherein the at least one UE includes a plurality of UEs, and UEs causing a larger amount of uplink interference to neighboring cells are assigned a smaller transmission probability than UEs causing a smaller amount of uplink interference.

3. The method of claim 1, wherein determining the parameter comprises:

determining by the at least one RNC a credit value to be assigned to the at least one UE based on an amount of uplink interference caused by the at least one UE.

4. The method of claim 1, wherein the at least one RNC determines the parameter and transmits the determined parameter to the scheduling Node B, and the scheduling Node B determines a scheduling transmission probability that the at least one UE will transmit based on the parameter.

5. The method of claim 4, wherein the at least one UE includes a plurality of UEs, and UEs causing a larger amount of uplink interference to neighboring cells are assigned a smaller transmission probability than UEs causing a smaller amount of uplink interference.

6. The method of claim 5, wherein the uplink schedule includes a transmit power or transmit rate to be used by the at least one UE, the parameter comprises a credit value, and the scheduling Node B applies the credit value to the transmit power or the transmit rate included in the uplink schedule to determine an allowable transmit power or transmit rate.

7. The method of claim 6, wherein the at least one UE includes a plurality of UEs, and UEs causing a larger amount of uplink interference to neighboring cells are assigned a smaller credit value than UEs causing a smaller amount of uplink interference.

8. The method of claim 1, wherein the parameter comprises a ratio formed by a path-loss or path-gain between the at least one UE and the scheduling Node B, and the path-loss or path-gain between the at least one UE and a non-scheduling Node B.

9. An uplink transmission scheduling method for a network including at least one radio network controller (RNC), a plurality of user equipment (UE), and a plurality of Node Bs, the method comprising:

scheduling UEs that cause a larger amount of uplink interference to neighboring cells to have a lower transmission power, rate or priority than UEs that cause a smaller amount of uplink interference, determining parameters to be applied to uplink transmission schedules of the UEs based on the amount of interference effect caused by the UEs to neighboring Node Bs, wherein the at least one RNC determines the parameters to be applied to the uplink schedules and transmits the determined parameters to the UEs, and the UEs determine a scheduling transmission probability that the UEs will transmit based on the parameters, wherein the uplink schedules include a transmit power or transmit rate to be used by the UEs, the parameters comprise credit values, and the UEs apply the credit values to the transmit power or the transmit rate included in the uplink schedule to determine an allowable transmit power or transmit rate.

10. The method of claim 9, wherein determining the parameters comprises:

determining by the at least one RNC credit values to be assigned to the UEs based on the amount of uplink interference caused by the UEs.

11. The method of claim 9, wherein the at least one RNC determines the parameters and transmits the determined parameters to the scheduling Node B, and the scheduling Node B determines scheduling transmission probabilities that the UEs under its control will transmit based on the parameter.

12. The method of claim 9, wherein the parameters comprise a ratio formed by a path-losses or path-gains between the UEs and the scheduling Node B, and the path-losses or path-gains between the UEs and a non-scheduling Node B.

* * * * *